(12) United States Patent
Jung et al.

(10) Patent No.: US 11,571,977 B2
(45) Date of Patent: Feb. 7, 2023

(54) METHOD, SERVER, AND PROGRAM FOR REPORTING ELECTRIC CAR CHARGING SPACE IN PARKING LOT

(71) Applicant: VESTELLALAB INC., Seoul (KR)

(72) Inventors: Sangsu Jung, Uiwang-si (KR); Eunjung Lee, Uiwang-si (KR); Youngsoo Lee, Gunpo-si (KR)

(73) Assignee: VESTELLALAB INC., Seoul (KR)

( * ) Notice: Subject to any disclaimer, the term of this patent is extended or adjusted under 35 U.S.C. 154(b) by 0 days.

(21) Appl. No.: 17/049,003

(22) PCT Filed: Apr. 18, 2019

(86) PCT No.: PCT/KR2019/004724
§ 371 (c)(1),
(2) Date: Oct. 19, 2020

(87) PCT Pub. No.: WO2019/203601
PCT Pub. Date: Oct. 24, 2019

(65) Prior Publication Data
US 2021/0237595 A1    Aug. 5, 2021

(30) Foreign Application Priority Data

Apr. 20, 2018 (KR) .................. 10-2018-0046065

(51) Int. Cl.
*B60L 53/126* (2019.01)
*B60L 53/60* (2019.01)
(Continued)

(52) U.S. Cl.
CPC ............ *B60L 53/126* (2019.02); *B60L 53/50* (2019.02); *B60L 53/60* (2019.02); *G08G 1/148* (2013.01)

(58) Field of Classification Search
CPC .......... Y04S 30/12; Y04S 30/14; Y02T 90/12; Y02T 90/14; Y02T 90/16; Y02T 90/167;
(Continued)

(56) References Cited

U.S. PATENT DOCUMENTS

| 8,290,649 B2 | 10/2012 | Iwashita et al. |
| 2012/0130891 A1* | 5/2012 | Bogaard ................. B60L 53/60 705/40 |

(Continued)

FOREIGN PATENT DOCUMENTS

| JP | 2008-042984 A | 2/2008 |
| JP | 2012-093938 A | 5/2012 |

(Continued)

OTHER PUBLICATIONS

KR Office Action dated Sep. 25, 2019 as received in Application No. 10-2018-0046065.
(Continued)

*Primary Examiner* — Richard Isla
*Assistant Examiner* — Johali A Torres Ruiz
(74) *Attorney, Agent, or Firm* — Maschoff Brennan

(57) ABSTRACT

The present invention relates to a method for reporting an electric car charging space in a parking lot, the method comprising: identifying whether a charger of each of charging spaces in a parking lot is being used; identifying whether a car exists in each of the charging spaces; and selecting a chargeable space and reporting the selected chargeable space.

8 Claims, 7 Drawing Sheets

(51) Int. Cl.
  *B60L 53/50* (2019.01)
  *G08G 1/14* (2006.01)
(58) Field of Classification Search
  CPC ..... Y02T 10/70; Y02T 10/7072; G08G 1/148; G06Q 20/14; G06Q 20/145; B60Y 2200/91; B60L 53/50; B60L 53/60; B60L 53/68; B60L 53/126; B60L 53/305
  See application file for complete search history.

(56) References Cited

U.S. PATENT DOCUMENTS

| | | | |
|---|---|---|---|
| 2014/0089016 A1* | 3/2014 | Smullin | G06Q 10/02 705/5 |
| 2016/0189324 A1* | 6/2016 | Eramian | G06Q 10/02 705/13 |
| 2016/0352113 A1* | 12/2016 | Zhao | B60L 53/35 |
| 2017/0061508 A1* | 3/2017 | Sen | G08G 1/144 |
| 2017/0300803 A1* | 10/2017 | Beavers | G07B 11/00 |
| 2018/0089631 A1* | 3/2018 | Baker, Sr. | G06Q 10/087 |
| 2018/0105051 A1* | 4/2018 | Zheng | G06Q 20/3276 |
| 2018/0158150 A1* | 6/2018 | Li | G06Q 30/0283 |
| 2019/0304306 A1* | 10/2019 | Michalakis | G08G 1/144 |

FOREIGN PATENT DOCUMENTS

| | | |
|---|---|---|
| JP | 2014-127074 A | 7/2014 |
| KR | 10-2012-0107810 A | 10/2012 |
| KR | 10-1214448 B1 | 12/2012 |
| KR | 10-1343102 B1 | 12/2013 |
| KR | 10-2015-0090325 | 8/2015 |

OTHER PUBLICATIONS

KR Decision to Grant dated Mar. 24, 2020 as received in Application No. 10-2018-0046065.

* cited by examiner

METHOD, SERVER, AND PROGRAM FOR REPORTING ELECTRIC CAR CHARGING SPACE IN PARKING LOT

TECHNICAL FIELD

The present disclosure relates to a method for reporting an electric vehicle charging space in a parking lot.

BACKGROUND ART

In recent years, with the increasing spread of electric vehicles, parking lots where charging devices for electric vehicles are provided in parking spaces are increasing.

However, in a parking lot of a complex structure, it is difficult to find the location of the electric vehicle charger. Even if the location is known, users often wander around the parking lot to find an available charger.

Also, in many cases, cars often continue to be parked in the electric vehicle charging space provided in the parking lot even after electric vehicle charging is completed. Accordingly, a person guided to a charging space based on the operation status of the electric vehicle charging devices may need to find another charging space due to another person's electric vehicle being parked in the charging space.

Korean Patent Application Publication No. 10-2015-0090325 discloses background technology of the present disclosure, but fails to suggest a fundamental solution to the above-described issue.

DISCLOSURE

Technical Problem

Therefore, the present disclosure has been made in view of the above problems, and it is one object of the present disclosure to provide a method, server, and program for reporting an electric vehicle charging space in a parking lot through an application.

It is another object of the present disclosure to provide a method, server, and program for reporting an electric vehicle charging space in a parking lot to select an available charging space by checking whether a charger in each charging space in a parking lot is in use and checking whether there is a vehicle present in each charging space.

It will be appreciated by persons skilled in the art that the objects that can be achieved with the present disclosure are not limited to what has been particularly described hereinabove and other objects that can be achieved with the present disclosure will be more clearly understood from the following detailed description.

Technical Solution

In accordance with one aspect of the present disclosure, provided is a method for reporting, by an application server, an electric vehicle charging space in a parking lot through an application, the method including executing the application; receiving, from a parking lot server, a drawing of a parking lot which the electric vehicle enters; checking whether a charger is in use in each charging space in the parking lot through the parking lot server; identifying available charging spaces by checking whether a vehicle is present in charging spaces having an available charger; selecting one of the identified available charging spaces; and is playing information on a travel path to the selected space through the application.

The identifying of the available charging spaces includes checking whether the vehicle is present in the charging spaces having the available charger based on information received from an ultrasonic sensor, a geomagnetic sensor, or a CCTV installed in the parking lot.

The selecting includes selecting a space at a shortest distance from a current location of the electric vehicle from among the identified charging spaces.

The selecting includes, when the parking lot which the electric vehicle enters is a parking lot set as a favorite, selecting a space a shortest distance from a preferred space from among the identified available charging spaces, wherein the preferred space is preset through the application.

The method further includes a payment request step of providing an estimated charging time and charging fee for the electric vehicle to the application by checking vehicle information received from an OBD2 provided in the electric vehicle and requesting payment, wherein the vehicle information includes at least one of a vehicle type, a charging type, and a current fuel status.

The method further includes receiving information on a real-time charging status of the electric vehicle from the parking lot server, displaying a current charging status through the application, displaying a completion message when charging is completed, and transmitting, when a charging stop button is clicked through the application, a charging stop signal to the parking lot server.

The method further includes checking a payment approval received from the application and transmitting an activation request signal for the selected charging space to the parking lot server.

The method further includes visually displaying information on the charging spaces in the parking lot through the application.

The executing includes executing the application when the application server receives at least one of a signal for termination of a navigation system operating in the electric vehicle, a vehicle entry signal according to reception of a wireless signal at an entrance of the parking lot, and a vehicle entry signal according to NFC tag recognition at the entrance of the parking lot.

The receiving of the drawing includes receiving the drawing of the parking lot when the application server receives at least one of a signal for termination of a navigation system operating in the electric vehicle, a vehicle entry signal according to reception of a wireless signal at an entrance of the parking lot, and a vehicle entry signal according to NFC tag recognition at the entrance of the parking lot.

In accordance with another aspect of the present disclosure, provided is a server for reporting an electric vehicle charging space in a parking lot, the server including a controller configured to execute an application and to display, through the application, information on a travel path to a space selected through a selector; a communicator configured to receive, from a parking lot server, a drawing of a parking lot which the electric vehicle enters; a checker configured to check whether a charger is in use in each charging space in the parking lot through the parking lot server and to identify available charging spaces by checking whether a vehicle is present in charging spaces having an available charger; and the selector configured to select one of the available charging spaces identified through the checker.

Additionally, another method and system for implementing the present invention, and a computer-readable recording medium for recording a computer program for executing the method may be further provided.

In accordance with another aspect of the present disclosure, provided is a program for reporting an electric vehicle charging space in a parking lot, the program being combined with a computer as hardware and stored in a medium to execute the method for reporting an electric vehicle charging space in a parking lot.

Advantageous Effects

According to the present disclosure as described above, electric vehicle charging spaces in a parking lot that an electric vehicle enters may be checked in real time to report an available charging space, and a charging fee may be paid through an application.

In addition, according to the present disclosure, whether a charger in a charging space in a parking lot is in use and whether a vehicle is present in the charging space may be checked together. Thereby, incorrect reporting of a charging space may be prevented.

The effects of the present disclosure are not limited to the above-mentioned effects, and other effects that are not mentioned will be clearly understood by those skilled in the art from the following description.

MODE FOR INVENTION

Figure 1:
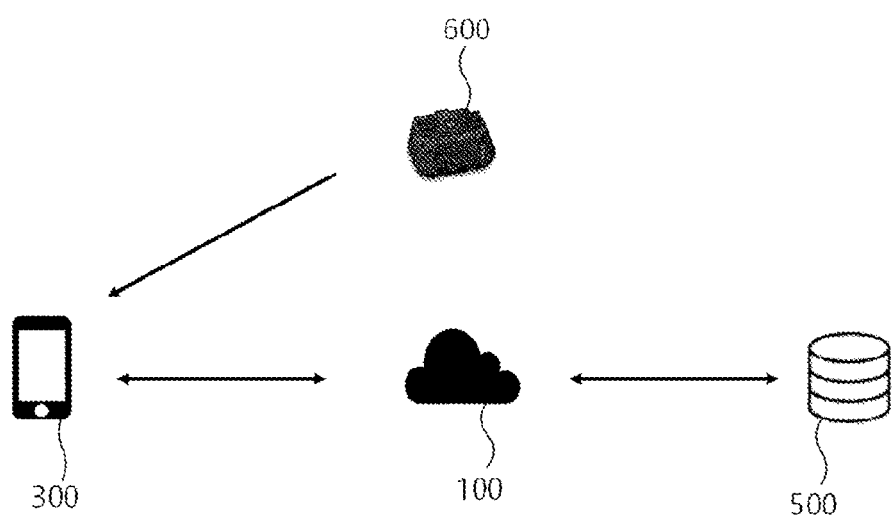
FIG. 1 is a schematic diagram illustrating a method for reporting an electric vehicle charging space in a parking lot according to an embodiment of the present disclosure.

Advantages and features of the present invention and methods of achieving the same will become apparent from the descriptions of exemplary embodiments hereinbelow with reference to the accompanying drawings. However, the present invention is not limited to exemplary embodiments disclosed herein but may be implemented in various different forms. The exemplary embodiments are provided to make the disclosure of the present invention thorough and to fully convey the scope of the present invention to those skilled in the art. It is to be noted that the scope of the present invention is defined only by the claims.

The terminology used herein is for the purpose of illustrating embodiments and is not intended to limit the present invention. In this specification, the singular forms include plural forms unless specifically stated otherwise. The terms "comprises" and/or "comprising" used in the specification do not exclude presence or addition of one or more elements other than the mentioned elements. Throughout the specification, the same reference numerals refer to the same elements, and "and/or" includes each and all combinations of one or more of the mentioned elements. Although "first", "second", and the like are used to describe various elements, it should be noted that that these elements are not limited by these terms. These terms are only used to distinguish one element from another element. Therefore, it should be noted that a first element mentioned below may be a second element within the technical spirit of the present disclosure.

Unless defined otherwise, all terms (including technical and scientific terms) used in this specification may be construed as having meanings commonly understood by those skilled in the art. Terms defined in typical dictionaries should not be interpreted ideally or excessively.

Hereinafter, embodiments of the present disclosure will be described in detail with reference to the accompanying drawings.

FIG. 1 is a schematic diagram illustrating a system for reporting an electric vehicle charging space in a parking lot according to an embodiment of the present disclosure.

Referring to FIG. 1, a system for reporting an electric vehicle charging space in a parking lot according to the embodiment of the present disclosure includes an application server 100, a client 300, a parking lot server 500, and an OBD2 600.

The client 300 is related to an electric vehicle using a parking lot, and may be a terminal owned by the owner of the electric vehicle, or a device connected to or embedded in the electric vehicle. In addition, an application 310 according to the embodiment of the present disclosure is installed on the client 300.

The application server 100 is a management server of the application 310 installed on the client 300. The client 300 and the application server 100 may exchange data through the application 310.

The application server 100 may receive information on the affiliated parking lot, reservation of available parking spaces, information on available parking spaces, and the like from the parking lot server 500 and provide services related to parking through the application 310 installed on the client 300.

The parking lot server 500 is a server related to a parking lot. It may be a local server that exists in each individual parking lot, or a central server that manages information on multiple parking lots.

According to an embodiment, the operating entity of the application server 100 may be the same as that of the parking lot server 500.

OBD2 (On Board Diagnostics) 600 is a device configured to diagnose the condition of a vehicle and report the result of the diagnosis. The OBD2 600 according to the embodiment of the present disclosure collects vehicle information including at least one of the vehicle type, charging type, and current fuel status (remaining battery level), and transmits the same to the application server 100.

Figure 2:
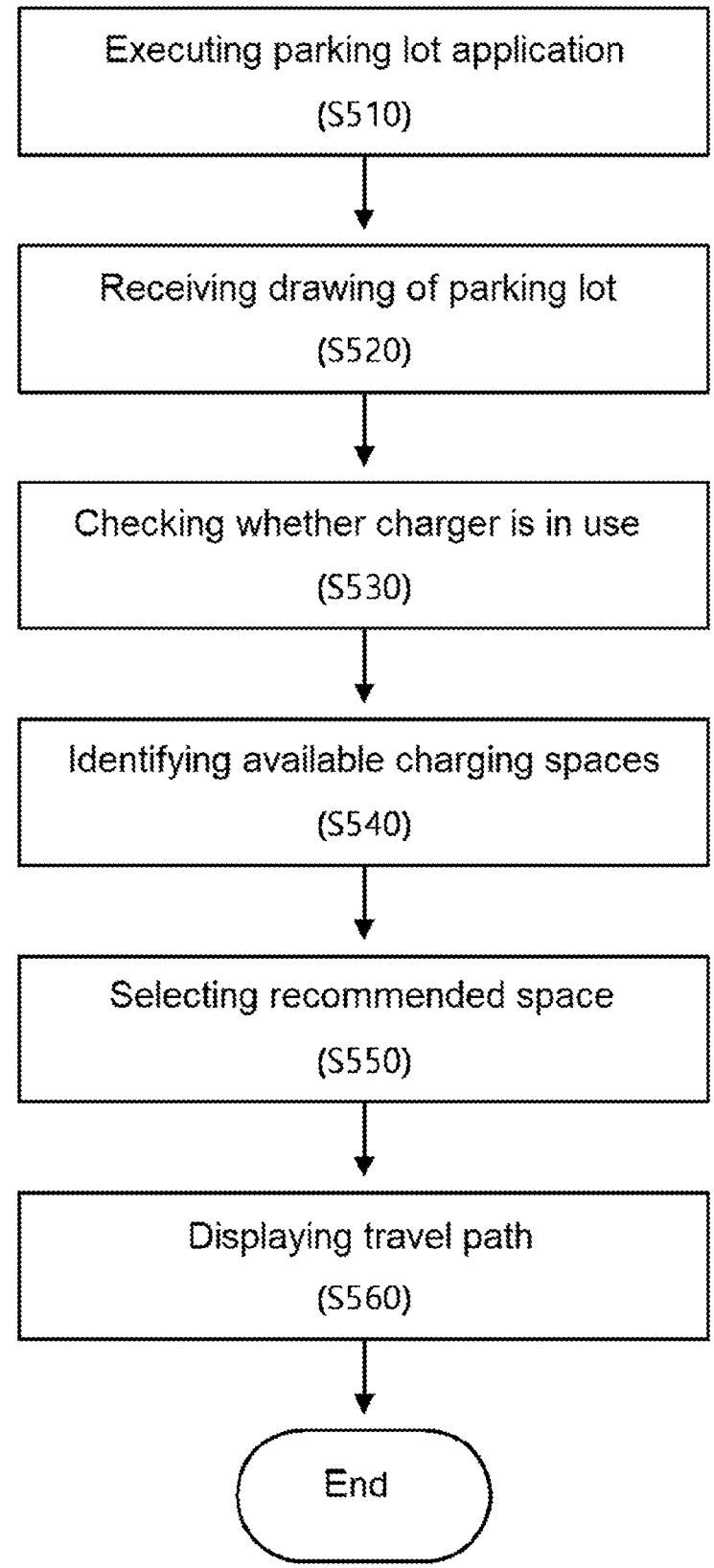
FIG. 2 is a flowchart of a method for reporting an electric vehicle charging space in a parking lot according to an embodiment of the present disclosure.
Figure 3:
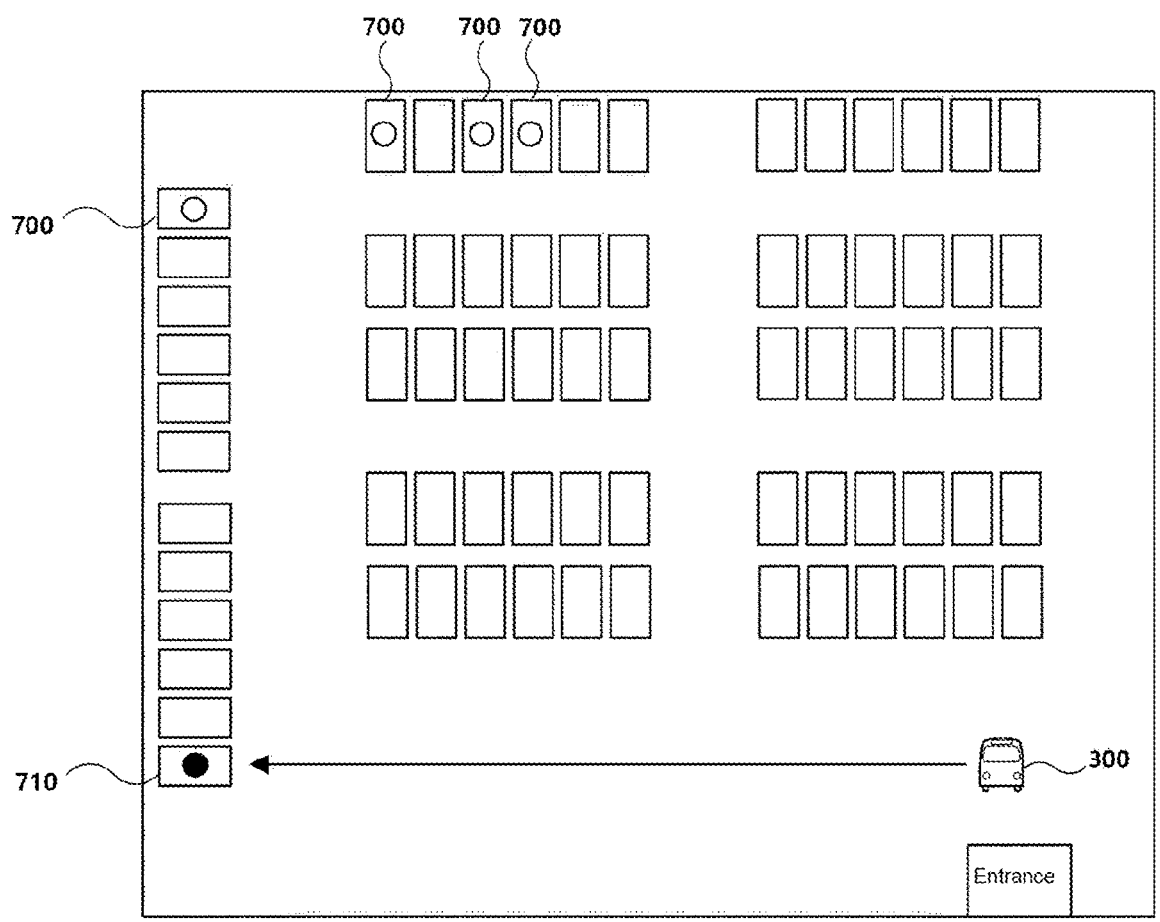
FIGS. 3 and 4 are exemplary diagrams illustrating guiding to a charging space in a parking lot through an application according to an embodiment of the present disclosure.
Figure 4:
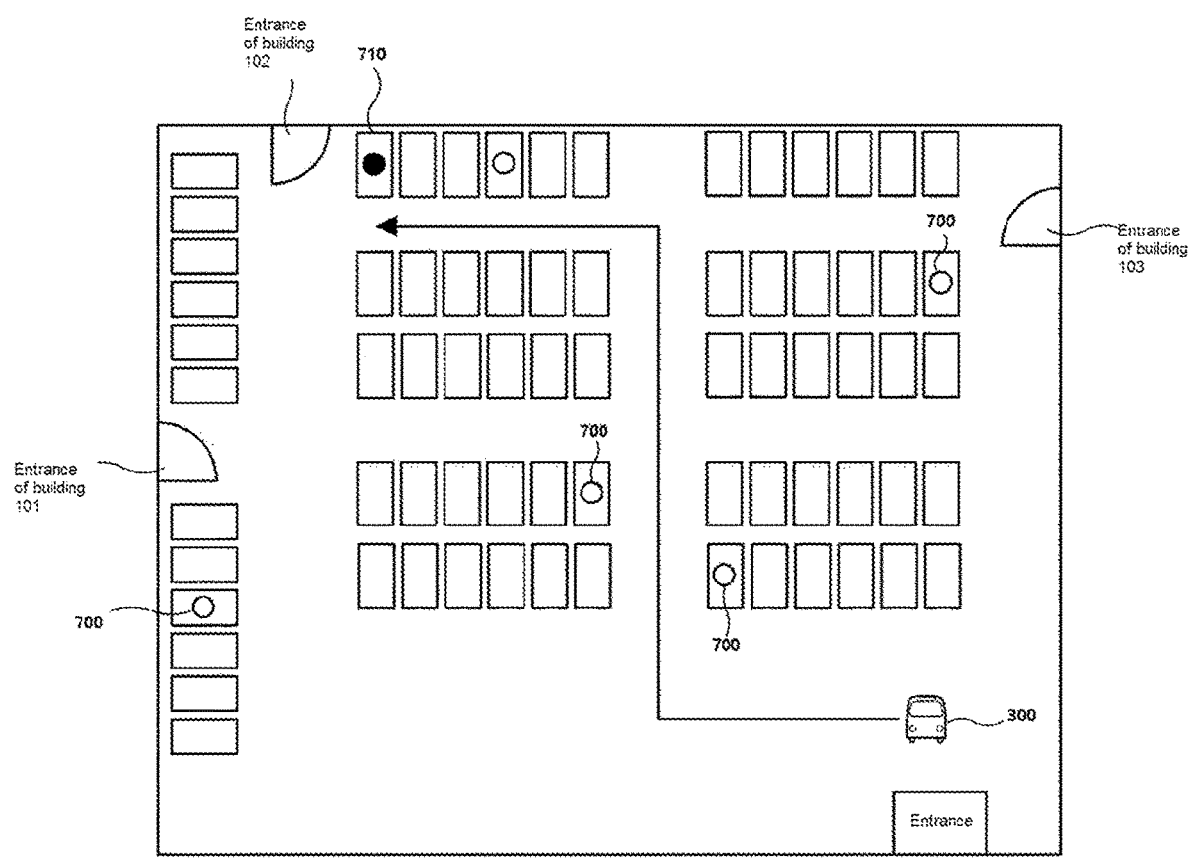

FIG. 2 is a flowchart of a method for reporting an electric vehicle charging space in a parking lot according to an embodiment of the present disclosure, and FIGS. 3 and 4 are exemplary diagrams illustrating guiding to a charging space in a parking lot through an application according to an embodiment of the present disclosure.

A method for reporting an electric vehicle charging space in a parking lot according to an embodiment of the present disclosure will be described with reference to FIG. 2.

First, the application server 100 or the client 300 checks entry of an electric vehicle into a parking lot, and then executes the application 310 (step S510).

Upon receiving at least one of a signal for termination of a navigation system operating in the electric vehicle, a vehicle entry signal according to a wireless signal at the parking lot entrance, and a vehicle entry signal according to NFC tag recognition at the parking lot entrance, the application server 100 or the client 300 executes the application 310 installed on the client 300.

For example, when the navigation system provided inside the vehicle terminates route guidance due to arrival at the destination, the application 310 transmits a navigation termination signal to the application server 100.

Also, when the navigation system installed on the client 300 terminates route guidance due to arrival at the destination, the application 310 transmits a navigation termination signal to the application server 100.

When the NFC tag of the electric vehicle is recognized at the entrance of the parking lot, and thus the entry of the electric vehicle is detected, the application server 100 may receive a vehicle entry signal from the parking lot server 500.

After step S510, the application server 100 receives, from the parking lot server 500, a drawing of the parking lot that the electric vehicle enters (step S520)

Upon receiving at least one of a signal for termination of the navigation system operating in the electric vehicle, a vehicle entry signal according to reception of a wireless signal at the entrance of the parking lot, and a vehicle entry signal according to NFC tag recognition at the entrance of the parking lot, the application server 100 receives a drawing of the parking lot from the parking lot server 500.

More specifically, the application server 100 receives a drawing of the parking lot that the electric vehicle enters or a parking lot near the current location of the electric vehicle.

As another example, since it is more efficient to store drawing data about a drawing of a parking lot at a place (e.g., a house, a company, etc.) that the client 300 frequently visits than to load the drawing every time the place is visited, the application server 100 stores the drawing data in a database 150.

Accordingly, when the parking lot that the electric vehicle enters is a parking lot set as a favorite, the application server 100 loads the drawing of the parking lot stored in the database 150 of the application server 100. In this case, the parking lot set as a favorite refers to a parking lot preset through the application 310.

After step S520, the application server 100 checks whether a charger in each charging space in the parking lot is in use through the parking lot server 500 (step S530)

Identification numbers of the respective spaces in the parking lot are stored in the parking lot server 500, and the parking lot server 500 receives information on the usage status of the charger in each space in real time.

Accordingly, the application server 100 receives information on the usage status of the chargers in the spaces by communicating with the parking lot server 500, and thus identifies the spaces in which the charger is available.

After step S530, the application server 100 checks presence of a vehicle in a space where the charger is available through the parking lot server 500 to identify a space where charging is available (step S540).

In many cases, although the available space is checked based on the usage status of the chargers in step S530, an electric vehicle of another person may stay in the space or continue to be parked after charging is completed. Accordingly, step S540 is intended to provide reliable information to the client 300 through double checking of the spaces.

More specifically, the application server 100 checks whether a vehicle is present in a space where the charger is available based on the information received from an ultrasonic sensor 520, a geomagnetic sensor 530, or a CCTV 540 installed in the parking lot, thereby identifying available charging spaces 700.

Here, the information received by the application server 100 from the CCTV 540 refers to image information captured through the CCTV 540, and the presence or absence of a vehicle is determined by analyzing the image through an internal system. Since determining the presence or absence of a vehicle by analyzing the image is a general technique, a detailed description thereof will be omitted.

After step S540, the application server 100 selects one of the available charging spaces 700 identified in step S530 and step S540 (step S550).

Preferably, the application server 100 selects a space on the shortest path from the current location of the client 300 from among the available charging spaces 700 identified in step S530.

In this operation, the controller 120 of the client 300 may identify information about the floor and location in the parking lot where the electric vehicle is currently located through indoor positioning, and select a space on the shortest path from the current location of the client 300.

Referring to FIG. 3, four available charging spaces 700 are identified, but the application server 100 selects a selectable space 710 that is the shortest distance from the client 300 and guides the client 300 thereto.

Alternatively, the application server 100 may receive, from the parking lot server, the location of the entrance of the parking lot which the client 300 enters and select a space at the shortest distance from the entrance of the parking lot.

Since various methods may be used to check the current location of the client 300, a person practicing the invention may easily select one of the methods.

The application server 100 may visually display information on electric vehicle charging spaces in the parking lot through the application 310.

In another embodiment, when the parking lot that the electric vehicle enters is a parking lot set as a favorite, the application server 100 selects a space at the shortest distance from a preferred space among the available charging spaces 700 identified in step S530.

Here, the favorite and the preferred space are preset through the application 310.

In this regard, an example will be described with reference to FIG. 4.

A parking lot set as a favorite may be a parking lot at a place such as a house or company that the client 300 frequently visits.

In the case where the owner of an electric vehicle lives in building 102 and has set the entrance of the building 102 as a preferred space, the owner of the electric vehicle will prefer to charge the electric vehicle in a space close to the entrance of building 102.

Accordingly, although there is an available charging space 700 that is closer than the selectable space 710, the application server 100 selects the selectable space 710 and guides the client 300 thereto because the selection space 710 is the shortest distance from the preferred space.

After step S550, the application server 100 displays information on a travel path to the space selected through the application 310 in step S550 (step S560)

This means that the application server 100 guides the client to the selectable space 710 selected in step S550 as illustrated in FIGS. 3 and 4.

Then, the owner of the electric vehicle arrives at the selectable space 710 to park and charge the electric vehicle.

Figure 5:
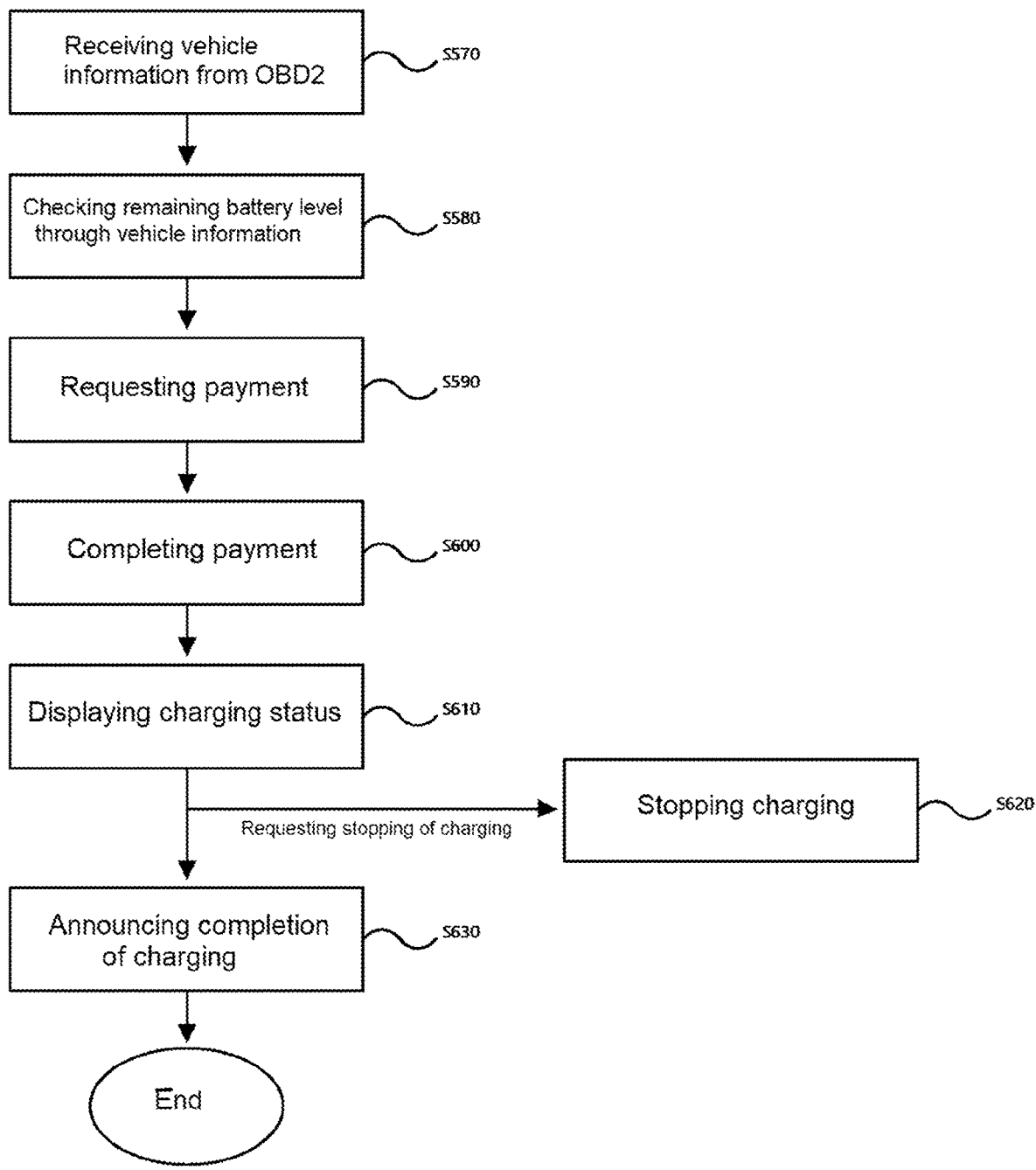
FIG. 5 is a flowchart of a method for providing guidance on charging of an electric vehicle and payment through OBD2 according to an embodiment of the present disclosure.

FIG. 5 is a flowchart of a method for providing guidance on charging of an electric vehicle and payment through OBD2 according to an embodiment of the present disclosure.

According to an embodiment of the present disclosure, after step S560, the method for providing guidance on charging of an electric vehicle and payment through OBD2 further includes a step of receiving information on the real-time charging status of the electric vehicle from the parking lot server 500, displaying the current charging status through the application 310, displaying a completion message when charging is complete, and transmitting a charging stop signal to the parking lot server 500 when a charging stop button is clicked through the application 310, a step of checking a payment approval received from the application 310 and transmitting an activation request signal for the selected electric vehicle charging space to the parking lot server 500, and a step of checking the payment approval received from the application 310 and transmitting the activation request signal for the selected electric vehicle charging space to the parking lot server 500.

The steps prior to step S570 have been described with reference to FIG. 2, and thus description thereof will be omitted.

After step S560, the application server 100 receives vehicle information about the electric vehicle from the OBD2 600 provided in the electric vehicle (step S570)

Here, the vehicle information includes at least one of a vehicle type, a charging type, and a current fuel status.

Preferably, the client 300 is connected and paired with the OBD2 600 to receive the vehicle information in real time, and the application server 100 receives the vehicle information from the client 300.

After step S570, the application server 100 checks the level of remaining battery through the vehicle information (step S580)

Preferably, the application server 100 checks the total capacity and the remaining capacity of the battery through the vehicle information.

After step S580, the application server 100 provides an estimated time and fee for charging of the electric vehicle to the application 310, and requests payment (step S590).

After step S590, the application server 100 confirms the payment of the client 300 and completes payment (step S600).

Here, an external payment service server may be in charge of the actual payment.

Although the application server 100 is not directly responsible for the payment process, the client 300 determines that the payment has been successfully approved upon receiving a payment completion signal from the external payment service server.

Specifically, the application server 100 checks the payment approval received from the application 310 and transmits an activation request signal for the selected electric vehicle charging space to the parking lot server 500.

Here, the activation request signal for the selected electric vehicle charging space is transmitted to cause the parking lot server 500 to activate the space because the facility of the parking lot may be equipped with a blocking means to prevent a normal vehicle other than an electric vehicle from parking in the electric vehicle charging space.

After step S600, the application server 100 receives information about the real-time charging status of the electric vehicle from the parking lot server 500, and displays the current charging status through the application 310 (step S610).

More specifically, the application server 100 may display information such as a current battery capacity of the electric vehicle, a driving-allowed distance in km at the current battery capacity, an estimated time to end charging, and the like through the application 310.

After step S610, the application server 100 receives the charging completion signal for the electric vehicle from the parking lot server 500, and displays a charging completion message through the application 310.

In the case where the application server 100 receives a charging stop signal from the application 310 before charging is completed, the application server transmits the charging stop signal to the parking lot server 500.

More specifically, when the charging stop button is clicked through the application 310, the application 310 transmits a charging stop signal to the application server 100, and the application server 100 transmits the charging stop signal to the parking lot server 500 to stop charging of the electric vehicle.

For example, the owner of an electric vehicle may want to end charging, or there may be a situation in which charging needs to be terminated and the vehicle needs to be driven. Accordingly, when the stop charging button is clicked through the application 310, charging of the electric vehicle is stopped.

Then, the application server 100 may cancel the payment, and may request repayment based on the battery capacity at the time when charging is stopped, or convert the cancelled payment into saved money to be stored in the application server 100.

Figure 6:
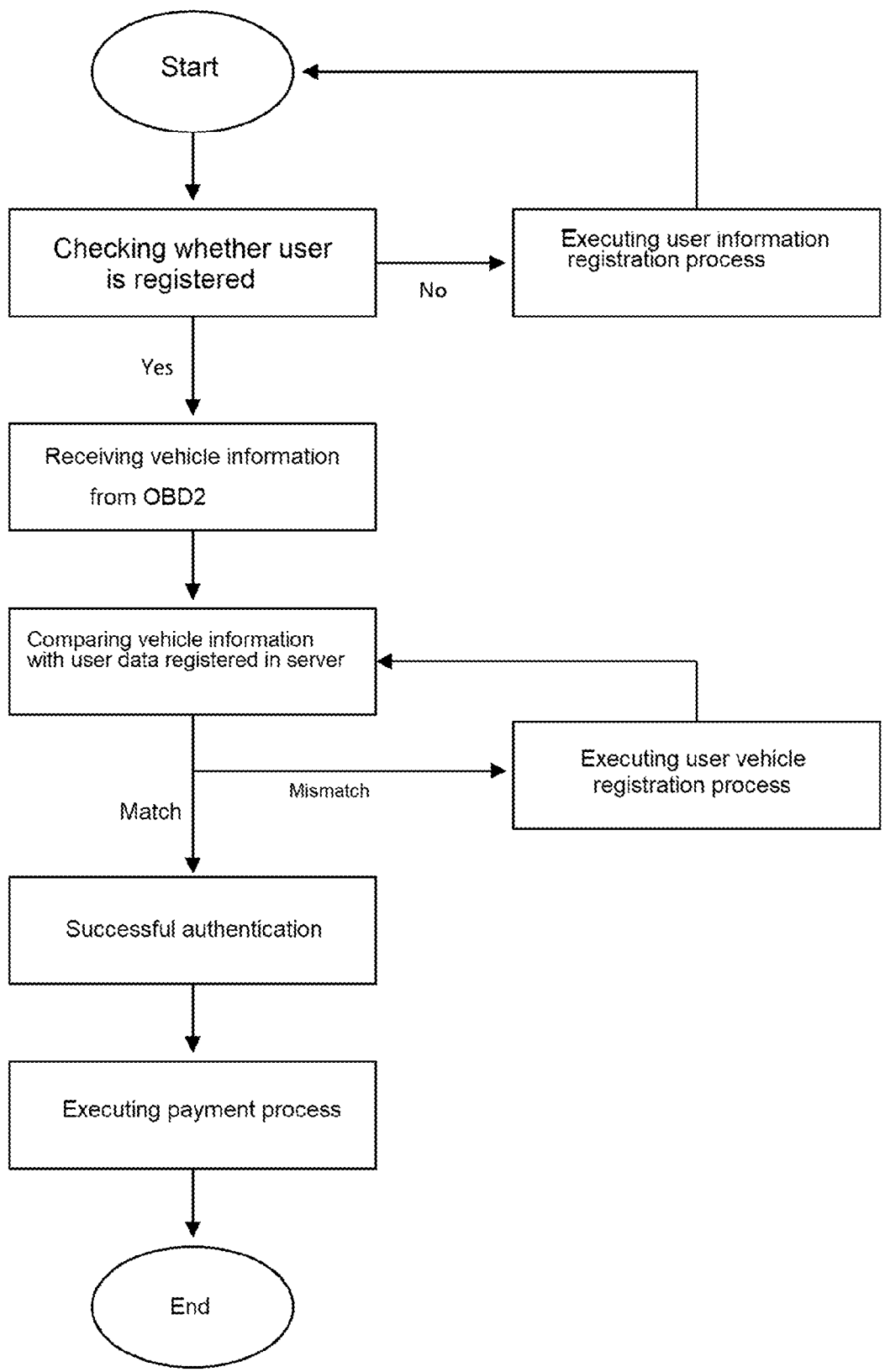
FIG. 6 is a flowchart illustrating a payment process according to an embodiment of the present disclosure.

FIG. 6 is a flowchart illustrating a payment process according to an embodiment of the present disclosure.

A payment process according to an embodiment of the present disclosure will be described with reference to FIG. 6.

The application server 100 checks whether the user is registered in the server through the application 310. Here, the user refers to the owner of the electric vehicle or a user who logs in to the client 300 on which the application 310 is installed.

In the case where the user is not subscribed to or registered in the application server 100, the server executes a user information registration process through the application 310.

When the user is identified, the application server 100 receives vehicle information from the OBD2 600 provided in the electric vehicle.

Next, the application server 100 compares the vehicle information received from the OBD2 600 with user data registered in the server.

In addition, when the information does not match the data as a result of the comparison, the application server 100 determines that the user has changed vehicles or is using another vehicle, and executes the user vehicle registration process through the application 310.

When the vehicle information received from the OBD2 600 matches the user data registered in the server, the application server 100 determines that authentication is successful, and executes a payment process.

Figure 7:
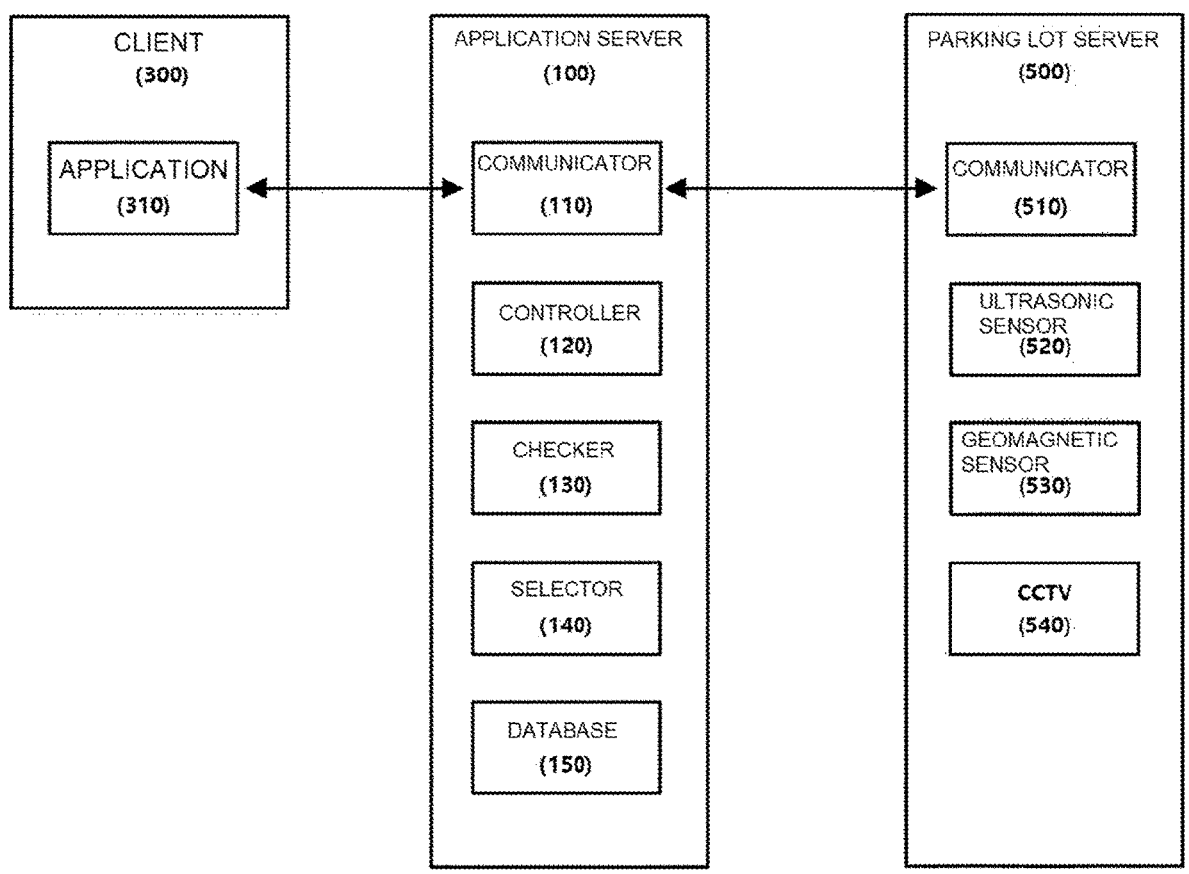
FIG. 7 is a block diagram of a server for reporting an electric vehicle charging space in a parking lot according to an embodiment of the present disclosure.

FIG. 7 is a block diagram of a server for reporting an electric vehicle charging space in a parking lot according to an embodiment of the present disclosure.

Referring to FIG. 7, a server for reporting an electric vehicle charging space in a parking lot according to an embodiment of the present disclosure includes a controller 120, a communicator 110, a checker 130, and a selector 140.

The controller 120 executes the application 310, and displays, through the application 310, information on a travel path to the space selected through the selector 140.

The communicator 110 receives, from the parking lot server 500, a drawing of the parking lot which the electric vehicle enters.

The checker 130 checks whether a charger is available in each charging space in the parking lot through the parking lot server 500, and checks presence of a vehicle in the charging spaces where the charger is available to identify available charging spaces 100.

More specifically, the checker 130 checks presence of a vehicle in the charging spaces where the charger is available based on information received from the ultrasonic sensor 520, the geomagnetic sensor 530, or the CCTV 540 installed in the parking lot to identify available charging spaces 700.

The selector 140 selects one of the available charging spaces 700 identified through the checker 130.

In this operation, the selector 140 selects a space that is at the shortest distance from the current location of the electric vehicle among the available charging spaces 700 identified through the checker 130.

In another embodiment, when the parking lot which the electric vehicle enters is a parking lot set as a favorite, the selector 140 selects a space that is at the shortest distance from a preferred space from among the identified available charging spaces 700. Here, the favorite and the preferred space are determined through the application 310.

The checker 130 checks the vehicle information received from the OBD2 600 provided in the electric vehicle, provides the application 310 with the estimated charging time and the charging fee for the electric vehicle through the communicator 110, and requests payment.

Here, the vehicle information includes at least one of a vehicle type, a charging type, and a current fuel status.

Then, the checker 130 checks the payment approval received from the application 310, and transmits an activation signal for the selected electric vehicle charging space to the parking lot server 500 through the communicator 110.

The controller 120 receives information on the real-time charging status of the electric vehicle from the parking lot server 500 through the communicator 110, displays the current charging status through the application 310, and displays a completion message when charging is completed. However, when the charging stop button is clicked through the application 310, the controller transmits a charging stop signal to the parking lot server 500 through the communicator 110.

In addition, the controller 120 visually displays information on electric vehicle charging spaces in the parking lot through the application 310.

The controller 120 may execute the application 310 when the following conditions are satisfied.

When the application server 100 receives, through the communicator 110, at least one of a signal for termination of a navigation system operating in the electric vehicle, a vehicle entry signal according to a wireless signal at the parking lot entrance, and a vehicle entry signal according to NFC tag recognition at the parking lot entrance, the controller 120 causes the application 310 to be executed.

Upon receiving, through the communicator 110, at least one of a signal for termination of the navigation system in the electric vehicle, a vehicle entry signal according to a wireless signal at the parking lot entrance, and a vehicle entry signal according to NFC tag recognition at the parking lot entrance, the application server 100 receives a drawing of the parking lot from the parking lot server 500.

The method for reporting an electric vehicle charging space in a parking lot according to the embodiment of the present disclosure described above may be implemented as a program (or application) to be executed in combination with a server, which is hardware, and stored in a medium.

In order for the computer to read a program and execute the methods implemented with the program, the above-described program for reporting an electric vehicle charging space in a parking lot may include code encoded in a computer programming language such as C, C++, JAVA, or a machine language readable by the processor (CPU) of a computer through a device interface of the computer. The code may include functional code related to a function or the like defining necessary functions for executing the methods, and control code related to an execution procedure necessary for the processor of the computer to execute the functions according to a predetermined procedure. In addition, the code may further include additional information necessary for the processor of the computer to execute the functions or memory reference-related code indicating the location (address) at which media should be referenced in an internal or external memory of the computer. In addition, when the processor of the computer needs to communicate with any other remote computer or server in order to execute the functions, the code may further include communication-related code indicating a method to communicate with any other remote computer or server using the communication module of the computer, information or media to be transmitted and received during communication, and the like.

The storage medium is not a medium that stores data for a short moment, such as a register, cache, or memory, but a medium that stores data semi-permanently and is readable by a device. Specifically, examples of the storage medium include, but are not limited to, a ROM, a RAM, a CD-ROM, a magnetic tape, a floppy disk, and an optical data storage device. In other words, the program may be stored in various recording media on various servers which the computer may access, or on various recording media on the computer of the user. In addition, the medium may store codes that is distributed to computer systems connected over a network, and is computer-readable in a distributed manner.

The steps of the method or algorithm described in relation to an embodiment of the present disclosure may be implemented directly in hardware, implemented as a software module executed by hardware, or a combination thereof. The software module may reside on a Random Access Memory (RAM), a Read Only Memory (ROM), an Erasable Programmable ROM (EPROM), an Electrically Erasable Programmable ROM (EEPROM), a Flash Memory, a hard disk, a removable disk, a CD-ROM, or any type of computer-readable recording medium well known in the art to which the present disclosure pertains.

Embodiments of the present disclosure have been described with reference to the accompanying drawings, but those skilled in the art to which the present invention pertains well appreciate that the invention can be implemented in other specific forms without departing from the technical spirit or essential features. Therefore, the embodiments described above are illustrative in all respects, and should be understood as non-limiting.

| [Reference Numerals] | |
|---|---|
| 100: Application server | 110: Communicator |
| 120: Controller | 130: Checker |
| 140: Selector | 150: Database |
| 300: Client | 310: Application |
| 500: Parking lot server | 510: Communicator |
| 520: Ultrasonic sensor | 530: Geomagnetic sensor |
| 540: CCTV | 600: OBD2 |
| 700: Available charging space | 710: Selectable space |

The invention claimed is:

1. A method for reporting, by an application server, an electric vehicle charging space in a parking lot through an application, the application server being a management server of the application installed on a client, and the client being a terminal owned by an owner of the electric vehicle, or a device connected to or embedded in the electric vehicle, the method comprising:
  executing the application;
  receiving, from a parking lot server, a drawing of a parking lot which the electric vehicle enters;
  checking whether a charger is in use in each charging space in the parking lot through the parking lot server;
  identifying available charging spaces by checking whether a vehicle is present in charging spaces having an available charger;
  selecting one of the identified available charging spaces;
  displaying information on a travel path to the selected space through the application;
  a payment request step of providing an estimated charging time and charging fee for the electric vehicle to the application by checking vehicle information received from an on board diagnostics device (OBD2) provided in the electric vehicle and requesting payment, wherein the vehicle information comprises at least one of a vehicle type, a charging type, and a current fuel status;
  receiving information on a real-time charging status of the electric vehicle from the parking lot server, displaying a current charging status through the application, displaying a completion message when charging is completed, and transmitting, when a charging stop button is clicked through the application, a charging stop signal to the parking lot server,
  wherein the executing comprises executing the application when the application server receives at least one of a signal for termination of a navigation system operating in the electric vehicle, a vehicle entry signal according to reception of a wireless signal at an entrance of the parking lot, and a vehicle entry signal according to NFC tag recognition at the entrance of the parking lot,
  wherein the receiving of the drawing comprises receiving the drawing of the parking lot when the application server receives at least one of a signal for termination of a navigation system operating in the electric vehicle, a vehicle entry signal according to reception of a wireless signal at an entrance of the parking lot, and a vehicle entry signal according to NFC tag recognition at the entrance of the parking lot.

2. The method of claim 1, wherein the identifying of the available charging spaces comprises:
  checking whether the vehicle is present in the charging spaces having the available charger based on information received from an ultrasonic sensor, a geomagnetic sensor, or a CCTV installed in the parking lot.

3. The method of claim 1, wherein the selecting comprises selecting a space at a shortest distance from a current location of the electric vehicle from among the identified charging spaces.

4. The method of claim 3, wherein the selecting comprises:
  when the parking lot which the electric vehicle enters is a parking lot set as a favorite, selecting a space a shortest distance from a preferred space from among the identified available charging spaces, wherein the preferred space is preset through the application.

5. The method of claim 1, further comprising:
  checking a payment approval received from the application and transmitting an activation request signal for the selected charging space to the parking lot server.

6. The method of claim 1, further comprising:
  visually displaying information on the charging spaces in the parking lot through the application.

7. An application server for reporting an electric vehicle charging space in a parking lot, the application server comprising:
  a controller configured to execute an application of the application server and to display, through the application, information on a travel path to a space selected through a selector;
  a communicator configured to receive, from a parking lot server, a drawing of a parking lot which the electric vehicle enters;
  a checker configured to check whether a charger is in use in each charging space in the parking lot through the parking lot server and to identify available charging spaces by checking whether a vehicle is present in charging spaces having an available charger; and
  the selector configured to select one of the available charging spaces identified through the checker,
  wherein:
    the application server is a management server of the application installed on a client, and the client is a terminal owned by a user of the electric vehicle, or a device connected to or embedded in the electric vehicle,
    when the user is identified, the application server is configured to receive vehicle information from an on board diagnostics device (OBD2) provided in the electric vehicle, and to compare vehicle information received from the OBD2 with user data registered in the application server, and wherein, when the information does not match the data as a result of the comparison, the application server is configured to determine that the user has changed vehicles or is using another vehicle, and execute the user vehicle registration process through the application,
    when the parking lot which the electric vehicle enters is a parking lot set as a favorite, the selector is configured to select a space that is at a shortest distance from a preferred space from among the identified available charging spaces, the favorite and the preferred spaces are determined through the application, and
    upon receiving at least one of a signal for termination of a navigation system operating in the electric vehicle, a vehicle entry signal according to a wireless signal at the parking lot entrance, and a vehicle entry signal according to NFC tag recognition at the parking lot entrance, the application server is configured to execute the application installed on the client and to receive a drawing of the parking lot from the parking lot server.

8. A non-transitory computer readable media having a program for reporting an electric vehicle charging space in a parking lot that when executed by a processor of a computer causes the processor to perform the method of claim 1.

* * * * *